US008977812B1

(12) United States Patent
Chen et al.

(10) Patent No.: US 8,977,812 B1
(45) Date of Patent: Mar. 10, 2015

(54) ITERATING IN PARALLEL FOR DEDUPLICATION

(75) Inventors: Xiangping Chen, Shrewsbury, MA (US); Miles A. de Forest, Bahama, NC (US); Siyu Zhou, Millis, MA (US); Samuel L. Mullis, Raleigh, NC (US); Brian M. Spadafora, Northborough, MA (US); Li Wan, North Attleboro, MA (US)

(73) Assignee: EMC Corporation, Hopkinton, MA (US)

( * ) Notice: Subject to any disclaimer, the term of this patent is extended or adjusted under 35 U.S.C. 154(b) by 402 days.

(21) Appl. No.: 13/075,487

(22) Filed: Mar. 30, 2011

(51) Int. Cl.
G06F 13/00 (2006.01)
G06F 13/28 (2006.01)

(52) U.S. Cl.
USPC ............... 711/112; 711/E12.002; 707/692

(58) Field of Classification Search
CPC .................. G06F 17/30156; G06F 3/0641
USPC ............... 711/112, E12.002; 707/692
See application file for complete search history.

(56) References Cited

U.S. PATENT DOCUMENTS

| 2009/0013140 A1* | 1/2009 | Bondurant et al. ........... 711/162 |
| 2010/0250501 A1* | 9/2010 | Mandagere et al. ......... 707/692 |
| 2011/0131390 A1* | 6/2011 | Srinivasan et al. ........... 711/209 |
| 2012/0151169 A1* | 6/2012 | Mori et al. ..................... 711/166 |
| 2012/0158672 A1* | 6/2012 | Oltean et al. .................. 707/692 |

* cited by examiner

Primary Examiner — Edward Dudek, Jr.
(74) Attorney, Agent, or Firm — Deepika Bhayana; Jason A. Reyes; Krishnendu Gupta

(57) ABSTRACT

A method is used in iterating in parallel for deduplication. Based on an iteration scheme, a collection of sections is selected from a set of storage extents. Each section of the collection of sections includes subset of the contents of a storage extent of the set of storage extents. Based on the iteration scheme, each section of the collection of sections is arranged in an ordered arrangement. Based on the ordered arrangement, a deduplicating technique is applied in parallel to each section of the collection of sections.

20 Claims, 8 Drawing Sheets

ITERATING IN PARALLEL FOR DEDUPLICATION

BACKGROUND

1. Technical Field

This application relates to iterating in parallel for deduplication.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data deduplication (also referred to simply as "deduplication") is a space-saving technology intended to eliminate redundant (duplicate) data (such as, files) on a data storage system. By saving only one instance of a file, disk space can be significantly reduced. For example, if a file of size 10 megabytes (MB) is stored in ten folders of each employee in an organization that has ten employees. Thus, 100 megabytes (MB) of the disk space is consumed to maintain the same file of size 10 megabytes (MB). Deduplication ensures that only one complete copy is saved to a disk. Subsequent copies of the file are only saved as references that point to the saved copy, such that end-users still see their own files in their respective folders. Similarly, a storage system may retain 200 e-mails, each with an attachment of size 1 megabyte (MB). With deduplication, the disk space needed to store each attachment of size 1 megabyte (MB) is reduced to just 1 megabyte (MB) from 200 megabyte (MB) because deduplication only stores one copy of the attachment.

Data deduplication can operate at a file or a block level. File deduplication eliminates duplicate files (as in the example above), but block deduplication processes blocks within a file and saves unique copy of each block. Further, block deduplication processes blocks within all files of a deduplication domain. For example, if only a few bytes of a document or presentation or a file are changed, only the changed blocks are saved. The changes made to few bytes of the document or the presentation or the file does not constitute an entirely new file.

While deduplication systems have helped make data management much easier, they also come with a number of challenges. Deduplicating systems iterate over large set of data blocks in order to find duplicate data block for deduplication. Iterating over large set of data consumes significant amount of storage resources.

SUMMARY OF THE INVENTION

A method is used in iterating in parallel for deduplication. Based on an iteration scheme, a collection of sections is selected from a set of storage extents. Each section of the collection of sections includes subset of the contents of a storage extent of the set of storage extents. Based on the iteration scheme, each section of the collection of sections is arranged in an ordered arrangement. Based on the ordered arrangement, a deduplicating technique is applied in parallel to each section of the collection of sections.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
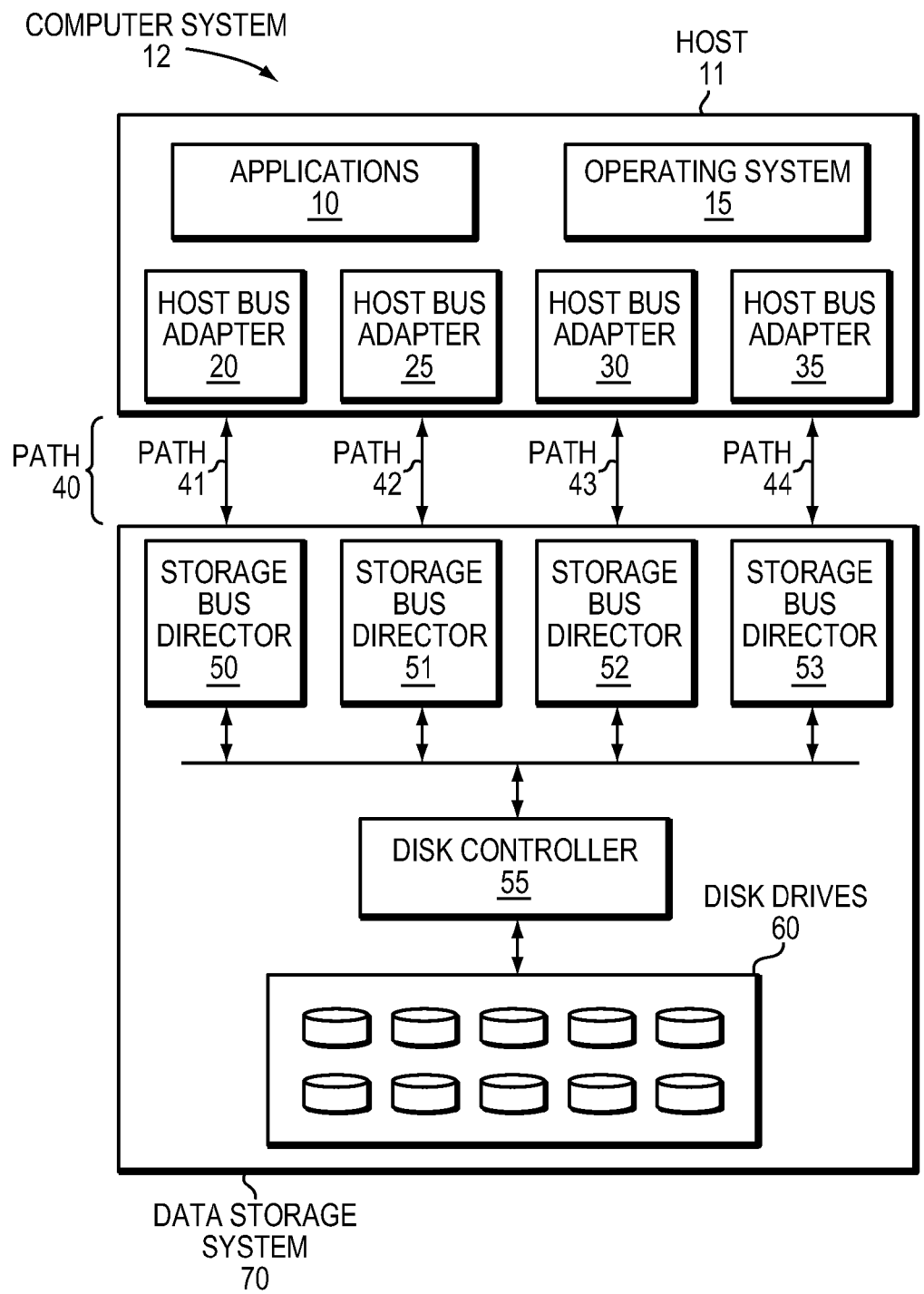
FIG. 1 is an example of an embodiment of a computer system that may utilize the techniques described herein.

Described below is a technique for use in iterating in parallel for deduplication (i.e., data deduplication), which technique may be used to provide, among other things, selecting a collection of sections from a set of storage extents based on an iteration scheme, arranging each section of the collection of sections in an ordered arrangement based on the iteration scheme and applying a deduplicating technique in parallel to each section of the collection of sections.

Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set. The size of this index table determines a window of deduplication opportunity. The larger the index table, the more blocks can be checked for duplicates, and thus the larger the opportunity for deduplication. However, a large index table consumes more storage resources and memory of the storage system. Therefore, given a limited amount of memory and/or storage resources, in at least some systems, it is impractical for every block of the storage system to be selected and information for that block stored in an index table. A goal is to select blocks that have a high probability of being deduplicated and find those blocks earlier using the least or a reduced amount of time, memory, and storage resources.

In at least one storage system implementation as described below, iterating in parallel for deduplication includes iterating over set of data blocks located in multiple storage extents in parallel, such that duplicates are found much earlier as there are many cases where duplicates are likely to be found at a similar offset in multiple storage extents.

Conventionally, data deduplication for feature software requires that data blocks in a storage extent be iterated from beginning to end. A set of storage extents that are deduplicated together form a deduplication domain. As a result, in a conventional system, each storage extent in the deduplication domain is iterated through completely followed by the next storage extent (i.e., iteration through a first storage extent is completed prior to commencement of iteration through a second storage extent). During this process, an index table of unique digests is created from the blocks that are iterated through. Thus, conventionally in such a case, in order for the system to perform data deduplication across multiple storage extents within a deduplication domain, the digest index table must be large enough to index all the unique blocks within a storage extent plus additional blocks in the next storage extent. Thus, a large digest index table in such conventional system consumes a large amount of storage resources. Further, iterating over a large sets of data takes more time, thus increasing the possibility that by the time possible duplicate data is found, original data might have become stale or changed. Therefore, in such a conventional system, to find duplicate data across multiple storage extents, each storage extent must be iterated from start to end irrespective of placement of duplicate data within each storage extent. Additionally, in many conventional cases, when duplicates are likely to be found at similar offsets within multiple storage extents, these duplicates are not found until each storage extent is completely iterated through. Additionally, in such a conventional system an iterator may track progress of deduplication processing within a storage extent. In such a conventional system, one iterator may not be able to track progress of deduplication processing efficiently and/or accurately, if multiple storage extents are iterated in parallel. Additionally, in such a conventional system, the number of data blocks that may be iterated in parallel is limited by the number of storage extents in a deduplication domain because each storage extent is iterated from start to end.

By contrast, in at least some implementations in accordance with the technique as described herein, the use of the iterating in parallel for deduplication technique can provide one or more of the following advantages: lowering costs by improving deduplication efficiency, improving memory utilization by reducing the index table size, and reducing the amount of storage required for data deduplication by finding the duplicates much earlier in the iteration process and thus greatly reducing the size of the index table without substantially affecting deduplication efficiency. In many cases the index table fits entirely in system memory thus substantially improving index table performance. Additionally, in at least some cases, iterating through a small sections of all storage extents in parallel can instantly start yielding high deduplication ratios.

Referring to FIG. 1, shown is an example of an embodiment of a computer system that may be used in connection with performing the techniques described herein. A computer system may include multiple hosts and multiple data storage systems in such a way that each host may access data on each of data storage systems. For simplicity, however, FIG. 1 illustrates a computer system 12 that includes a single host 11 and a single data storage system 70. Applications 10 running on operating system 15 of host 11 may access data in data storage system 70 via I/O driver and host bus adapters 20, 25, 30, and 35. Host 11 can be, for example, a server, a personal computer, or any other device capable of initiating read and write requests to data storage system 70. Data storage system 70 can be a single physical data storage device or a data storage system comprising multiple physical data storage devices including an enterprise storage system. In computer system, consistent with the principles of the invention, there may be a plurality of data storage systems 70 accessible by host 11 and each data storage system may be unique.

Host 11 has multiple paths 40 for sending I/O requests to data storage system 70. Typically, there are at least two paths from a host to a data storage system. FIG. 1 shows four paths from host 11 to data storage system 70: path 41, path 42, path 43, and path 44. Each of the paths 40 can be any of a number of different types of communication links that allow data to be passed between data storage system 70 and host 11. Each of the host bus adapters 20, 25, 30, and 35 would be adapted to communicate using an appropriate protocol via the paths 40 with the storage bus directors 50, 51, 52 and 53. For example, path 40 can be implemented as a SCSI bus with host bus adapters 20 and storage bus director 50 each being a SCSI driver. Alternatively, path 40 between the host 11 and the data storage subsystem 70 may be a Fibre Channel fabric. Moreover, a path 40 may include multiple communication path types and may be part of a communication network.

In this embodiment of the computer system 12, the host 11 may access the data storage systems 70, for example, in performing input/output (I/O) operations, data requests, and other operations. The host 11 may perform different types of data operations in accordance with different types of tasks. The communication medium, path 40, may be any one or more of a variety of networks or other type of communication connections as known to those skilled in the art. Each of the paths 41-44 may be a network connection, bus, and/or other type of data link, such as a hardwire or other connections known in the art. The processors included in the host computer systems 11 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 70 are described herein in more detail, and may vary with each particular embodiment. The host 11 and data storage system 70 may all be located at the same physical site, or, alternatively, may also be located in different physical locations.

Storage bus directors 50, 51, 52 and 53 further communicates with the disk controller 55 to access data stored on the disk drives 60. the disk controller 55 may be configured to perform data storage operations on behalf of the host 11. Host system 11 may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single data storage system may be accessed by multiple hosts allowing the hosts to share the data residing therein. An LV or LUN (logical unit number) may be used to refer to the foregoing logically defined devices or volumes.

Figure 2:
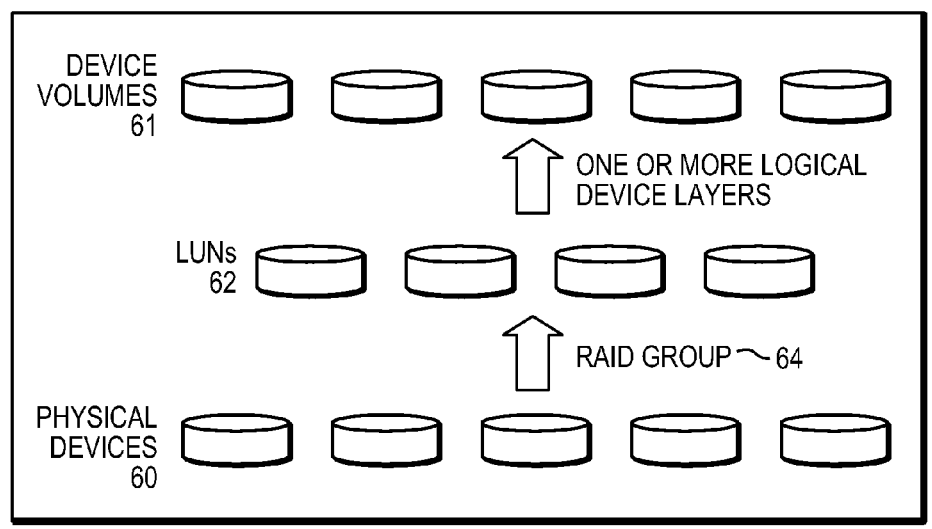
FIG. 2 is an example illustrating storage device layout.

FIG. 2 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

In another embodiment, the data storage subsystem 70 may include one or more data storage systems such as one or more of the data storage systems offered by EMC Corporation of Hopkinton, Mass. The data storage system may also include one or more data storage devices, such as disks. One or more data storage subsystems may be manufactured by one or more different vendors. Each of the data storage systems may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 70. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 70 of FIG. 1 is implemented using one or more data storage systems, each of the data storage systems may include code thereon for performing the techniques as described herein. In following paragraphs, reference may be made to a particular embodiment such as, for example, an embodiment in which element 70 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

As will be appreciated by those skilled in the art, the data storage system 70 may also include other components than as described for purposes of illustrating the techniques herein.

The embodiment of FIG. 1 benefits from iterating over various storage extents in accordance with the current technique in order to improve the performance of a data deduplication process within the embodiment. In particular, the data deduplication process may benefit from iterating over multiple storage extents in parallel in order to improve deduplication index efficiency. In at least some embodiments based on the current technique, a collection of sections from a set of storage extents can be selected in such a way that data blocks of the storage extents are iterated in parallel and processed for applying a deduplication technique. Selecting the collection of sections may be based on an iteration scheme.

Figure 3:
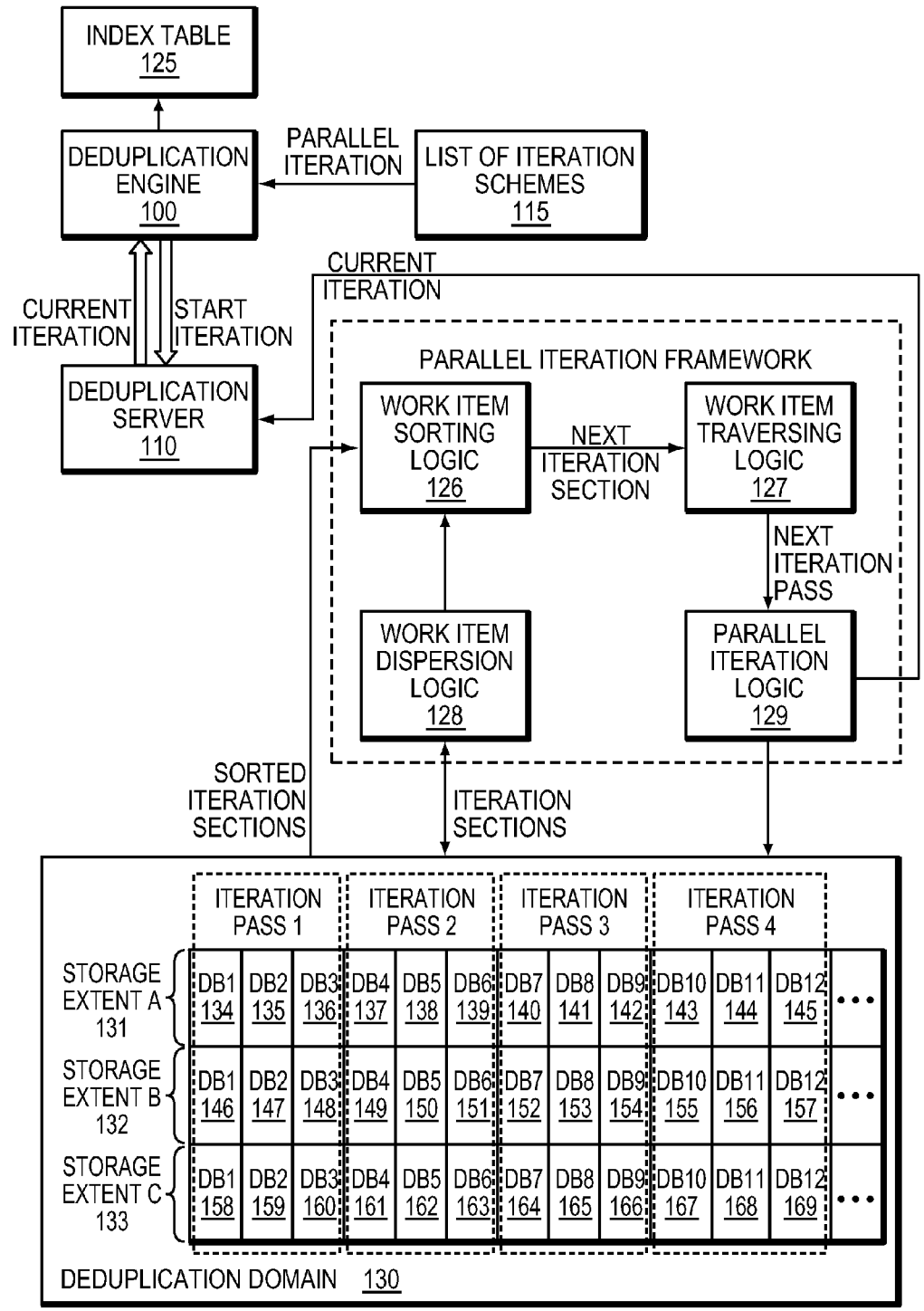
FIGS. 3 and 4 are diagrams illustrating in more detail components that may be used in connection with techniques herein.

Referring to FIG. 3, shown is a more detailed representation of components that may be included in an embodiment using the techniques herein. In a deduplication domain, each storage extent contains a range of data blocks. For example, in FIG. 3, storage extent A 131, storage extent B 132 and storage extent C 133 are part of the deduplication domain 130. Within a data storage system 70, there may be multiple deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 3, storage extent A 131 includes data blocks 134-145, storage extent B 132 includes data blocks 146-157 and storage extent C 131 includes data blocks 158-169 and other data blocks (not shown).

In at least one embodiment of the current technique, deduplication server 110 is a component that provides services to deduplication engine 100 to iterate over sets of data in a deduplication domain 130. Deduplication server 110 also computes digests and remaps blocks after a deduplication technique is applied to remove duplicate blocks of data. Deduplication engine 100 monitors deduplication configuration and coordinates processing across multiple deduplication domains by starting and stopping deduplication daemons for each deduplication domain.

Deduplication server 110 in FIG. 3 works in conjunction with a deduplication daemon and helps deduplication engine 100 maintains a deduplication database (such as index table 125) for a deduplication domain 130. Deduplication server 110 provides information such as digest to deduplication engine 100 which is maintained in the deduplication database by deduplication engine 100. The deduplication server 110 communicates with the deduplication engine 100 to iterate through deduplication domain 130 and computes digests for the data blocks that are iterated through. A digest is created for each chunk of data that is iterated. The deduplication daemon detects potential duplicate copies of data during the iteration and issues a request to the deduplication server 110 to deduplicate the data. The deduplication database is stored on one of the storage extents that includes one or more LUNs. Deduplication engine 100 also maintains an index table 125 on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 125. The more entries in the index table, the more likely that duplicate blocks will be detected during the iteration. To accommodate more entries, the index table requires more memory and storage resources. Additionally, if the amount of storage used by the user is in terabytes, it can take days to iterate over the chunks of data for such a large address space of the storage. Thus, the index table typically contains an incomplete set of entries and does not include digests for all of the data inside all of the storage in the deduplication domain. Deduplication engine 100 uses a set of factors that guides the deduplication engine in selecting a specific iteration scheme from a list of iteration schemes 115 maintained by a computer system. In at least one embodiment, use of the current technique enables selecting a parallel iteration scheme from the list of iteration schemes, such that iteration occurs in parallel over a collection of sections within a set of storage extents that have a high probability of being deduplicated. The iteration scheme may be supplied by a user or a system. The parallel iteration scheme may be supplied to deduplication engine 100 manually by a user via a tool or automatically during a deduplication process. The parallel iteration scheme may also be supplied by an application running on host or a computer system.

In at least some implementations in accordance with the technique as described herein, a parallel iteration framework includes work item sorting logic 126, work item traversing logic 127, work item dispersion logic 128 and parallel iteration logic 129. The parallel iteration framework supports list of iteration schemes 115 and includes a pool of processes that perform iterations of data blocks in parallel. The work item dispersion logic 128 divides the logical address space of a deduplication domain into multiple fixed sized sections where a section does not overlap with another section in the deduplication domain. In at least one embodiment of the current technique, work item dispersion logic 128 divides the logical address space of each storage extent of the deduplication domain into fixed sized sections. The size of the section may be 512 kilobytes, 64 kilobytes or any other size that is suitable for iterating in parallel for deduplication. Further, each fixed sized section may include one or more data blocks that are iterated for deduplication. The number of data blocks that may be included in each fixed sized section depends upon the size of the fixed sized section and the size of a data block. Further, the size of a fixed sized section may be determined by the maximum size of an I/O that may be performed during an iteration. Work item dispersion logic 128 eliminates or reduces the need to track progress for each I/O operation occurring in parallel when multiple fixed sized sections are iterated for deduplication. The work item sorting logic 126 arranges fixed sized sections created by work item dispersion logic 128 in an ordered arrangement based on an iteration scheme in such a way that sections containing data blocks that may have a high probability of containing duplicate data are located closer to each other in the ordered arrangement. As a result, the sections containing data blocks that may have a high probability of getting deduplicated are iterated in parallel which enables the data storage system to find duplicates faster and efficiently. Work item sorting logic 126 may use any of a number of different types of sorting algorithms that allow sections to be arranged in an ordered arrangement. The ordered arrangement determines how a deduplication domain may be iterated in parallel. Further, in one embodiment, the logical address space of a deduplication domain may be arranged in an ordered arrangement by sorting storage extents of the deduplication domain in a pre-defined deterministic manner. Alternatively, in another embodiment, the logical address space of a deduplication domain may be arranged in an ordered arrangement by sorting block mappings of data blocks included in the deduplication domain. Parallel iteration logic 129 uses a pool of processes for iterating a set of sections in parallel where each process of the pool of processes iterate a section from the set of sections. The number of sections that may be iterated in parallel is determined by the number of processes in the pool of processes. Based on the ordered arrangement, work item traversing logic 127 provides information to parallel iteration logic 129 regarding a set of sections that may be iterated in parallel. When a process from the pool of processes finish iterating a section, the process receives information regarding a section that may be iterated next from work item traversing logic 127. Fixed sized sections from a deduplication domain are processed in the ordered arrangement determined by work item sorting logic 126. The work item traversing logic 127 tracks progress of iteration in such a way that a current iterator points to a section currently being iterated by deduplication server 110. Further, the work item traversing logic 127 avoids overlap in deduplication processing by ensuring that a data block is not processed for deduplication more than once when a set of sections are iterated in parallel by parallel iteration logic 129. An iterator generation function generates an iterator value based on the current section being iterated by parallel iteration logic 129. Deduplication server 110 provides information regarding the iterator value (also referred to as current iterator) to deduplication engine 100. The deduplication engine 100 may store the current iterator in a persistent storage. The current iterator stored on the persistent storage is used to resume a deduplication processing from the point the deduplication processing was paused or stopped. The deduplication processing resumes from the section indicated by the current iterator.

For example, in FIG. 3, in one embodiment of the current technique, deduplication server 110 iterates over a collection of data blocks from a set of storage extents (A 131, B 132 and C 133) in deduplication domain 130 wherein every data block in the collection of data blocks is processed for deduplication based on a parallel iteration scheme. Each storage extent (e.g., A 131, B 132, C 133) of deduplication domain 130 is divided into fixed sized sections. For example, a first section of storage extent A 131 includes data blocks 134-136, a second section of storage extent A 131 includes data blocks 137-139, a third section of storage extent A 131 includes data blocks 140-142, and a fourth section of storage extent A 131 includes data blocks 143-145. Similarly, a first section of storage extent B 132 includes data blocks 146-148, a second section of storage extent B 132 includes data blocks 149-151, a third section of storage extent B 132 includes data blocks 152-154, and a fourth section of storage extent B 132 includes data blocks 155-157. Similarly a first section of storage extent C 133 includes data blocks 158-160, a second section of storage extent C 133 includes data blocks 161-163, a third section of storage extent C 133 includes data blocks 164-166, and a fourth section of storage extent C 131 includes data blocks 143-145. In one embodiment, according to an ordered arrangement based on the parallel iteration scheme, for example, iteration pass 1 may include the first section of storage extent A 131, the first section of storage extent B 132, and the first section of storage extent C 133. For example, iteration pass 2 may include the second section of storage extent A 131, the second section of storage extent B 132, and the second section of storage extent C 133. Similarly, for example, iteration pass 3 may include the third section of storage extent A 131, the third section of storage extent B 132, and the third section of storage extent C 133 and iteration pass 4 may include the fourth section of storage extent A 131, the fourth section of storage extent B 132, and the fourth section of storage extent C 133. Parallel iteration logic 129 iterates sections of a deduplication domain in parallel based on an ordered arrangement. For example, the sections included in the iteration pass 1 may be iterated in parallel first, then the section included in the iteration pass 2 are iterated in parallel, and then the sections included in the iteration pass 3 are iterated in parallel. Deduplication server 110 computes digests for the data blocks in each section that is iterated and sends the digests to the deduplication daemon which processes the digests and adds new digests for the data blocks to index table 125 if necessary. The index table includes digests for each data block that is iterated during one or more iteration pass. Thus, digests created during multiple iterations are considered for deduplication and based upon the size of the index table, duplicates are found across multiple storage extents. For example, in FIG. 3, if the data stored in data block DB1 134 of storage extent 131 is same as the data stored in DB1 146 of storage extent B 132, the data block DB1 146 will be deduplicated during the iteration pass 1 because the digest created for the data block DB1 146 will match with the digest stored in the index table for the data block DB1 134.

Figure 4:
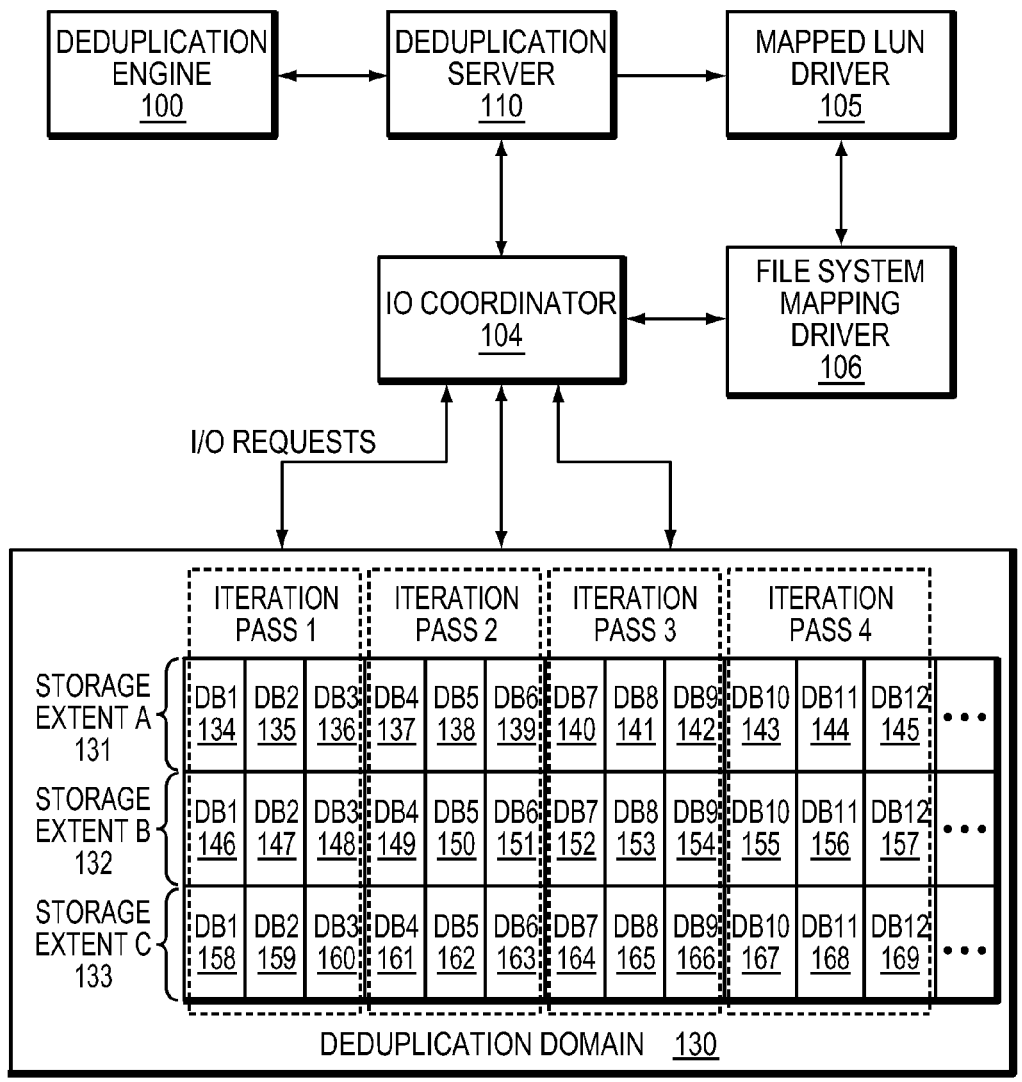

Referring to FIG. 4, shown is a more detailed representation of components that may be included in an embodiment using the techniques herein. During deduplication processing as described herein, deduplication server 110 provides services to deduplication engine 100 by interacting with Mapped LUN Driver (MLU) 105 and File System Mapping Driver 106 via IO Coordinator 104. In at least one implementation, deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 125) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of filesystem mapping driver 106 based on which Mapped LUNs are implemented by Mapped LUN driver 105. A filesystem allows dynamic manipulation of the address maps that connects the MLU's address space to its physical address space. The file system also allows mapping a single block of storage at multiple locations within the filesystem, and allows handling of writes to shared blocks by allocating new storage and updating the shared address mappings.

Mapped LUN Driver 105 presents a deduplication domain 130 as a logical object to deduplication server 110. Mapped LUN Driver 105 also manages the life cycle of files in a filesystem implemented by file system mapping driver 106, and adds LUN semantics to files and manages storage allocations from storage pools for the files. Driver 105 also provides configuration and state information related to storage pools, storage extents, and LUNs in a storage pool to other subsystems. IO Coordinator 104 manages IO operations in conjunction with the file system mapping driver 106. IO Coordinator 104 provides framework for implementing digest and other IO requests issued by the deduplication server 110.

Figure 5:
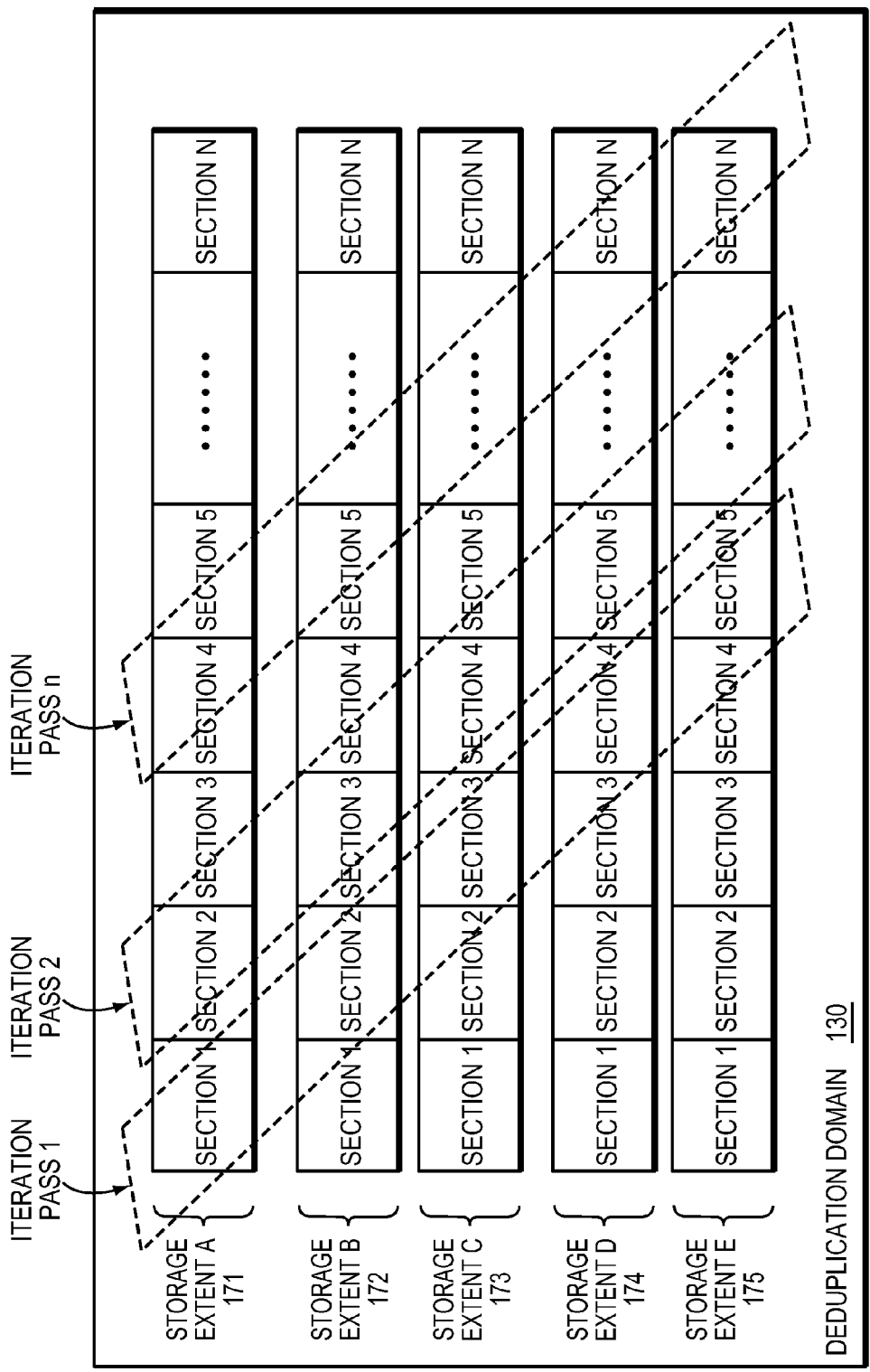
FIG. 5 is an example illustrating an iteration scheme across a set of storage extents.

Referring to FIG. 5, shown is one example of selection of a collection of sections that may be included in an embodiment using the techniques herein. A goal of the parallel iteration scheme in accordance with the current technique is to find duplicate blocks faster by iterating through a small range of a set of storage extents instead of iterating each storage extent completely one by one. Further, sections created by dividing the logical address space of each storage extent of the deduplication domain 130 may be arranged in any of a number of different ordered arrangement. One such ordered arrangement is shown in FIG. 5, where iteration pass 1 may include the first section from storage extent A 171, the second section from storage extent B 172, the third section from storage extent C 173, the fourth section from storage extent D 174, and the fifth section from storage extent E 175. Iteration pass 2 may include the second section from storage extent A 171, the third section from storage extent B 172, the fourth section from storage extent C 173, the fifth section from storage extent D 174, and the sixth section from storage extent E 175, and so on.

Figure 6:
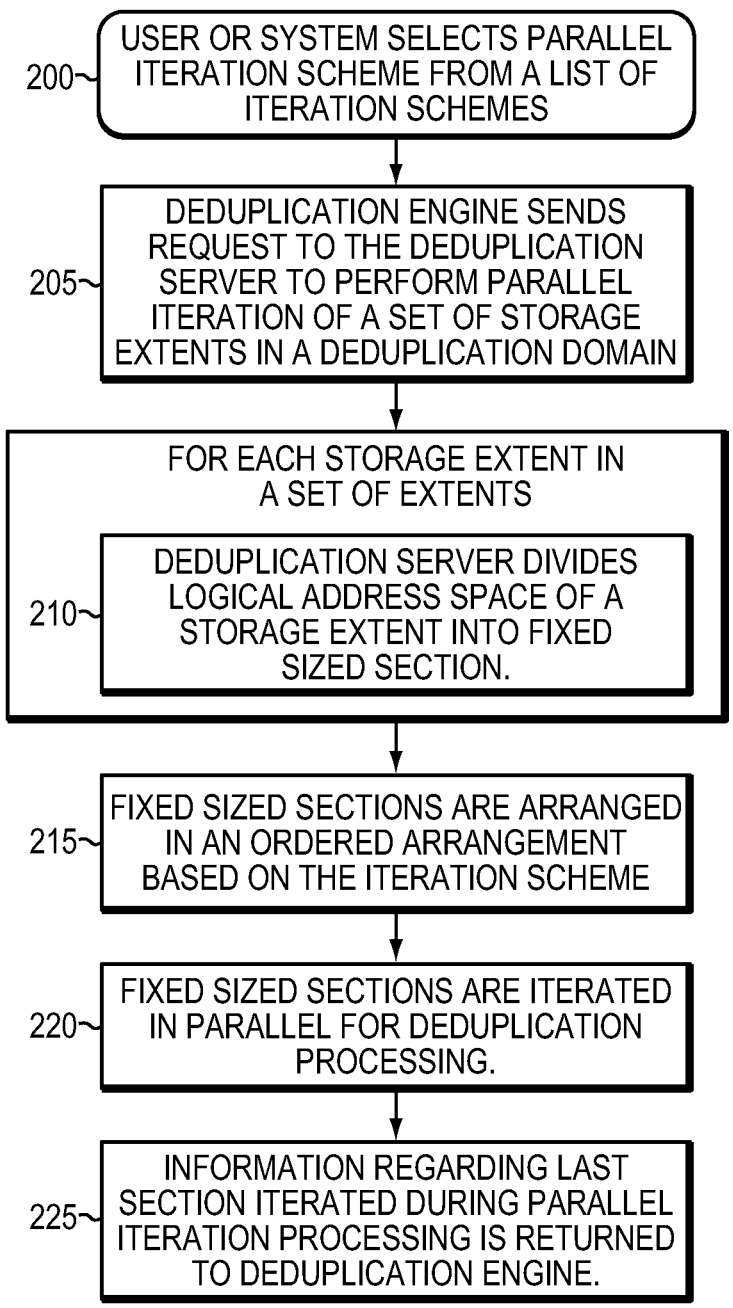
FIGS. 6-8 are flow diagrams illustrating processes that may be used in connection with techniques herein.

Referring to FIG. 6, shown is a flow diagram illustrating a flow of data in the data storage system. With reference also to FIGS. 3 and 4, a user or a system selects a parallel iteration scheme from a list of iteration schemes 115 (step 200). The selected iteration scheme is provided to the deduplication engine 100 that does the initialization for iterating through a set of storage extents in a deduplication domain and sends the request to the deduplication server 110 (step 205). For each storage extent of the set of storage extents in the deduplication domain, the logical address space of each storage extent is divided into fixed sized sections (step 210). Fixed sized sections of the deduplication domain are arranged in an ordered arrangement based on the selected iteration scheme (step 215). A set of sections are iterated in parallel for deduplication processing (step 220). At the end of the deduplication processing, information regarding a last section iterated by deduplication server 110 is returned to deduplication engine 100 (step 225). Deduplication engine 100 may store the information regarding the last section iterated by deduplication server 110 in a persistent storage. The information may be retrieved later to resume deduplication processing.

Figure 7:
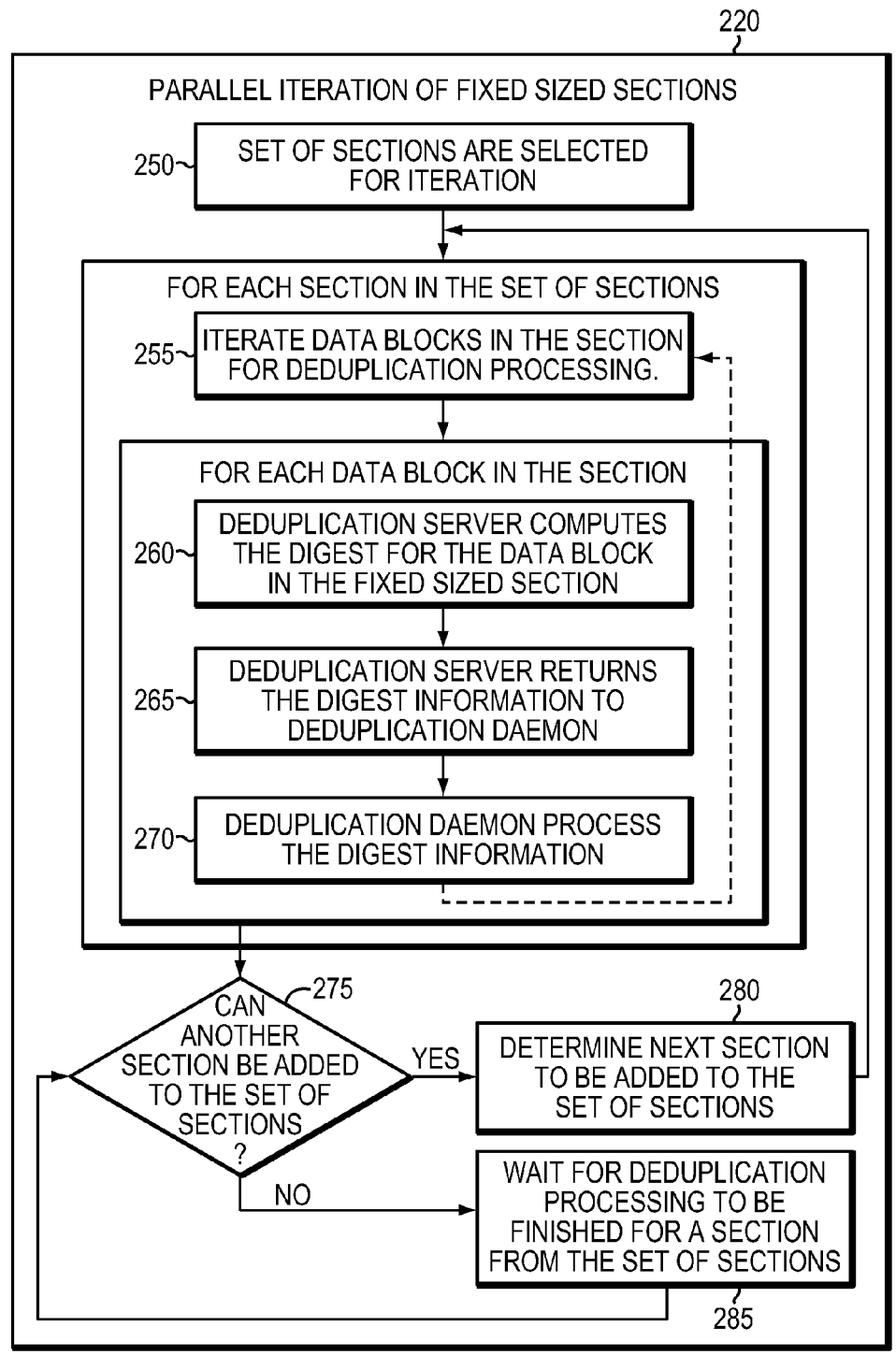

Referring to FIG. 7, shown is a detailed flow diagram illustrating a flow of data in the data storage system. With reference also to FIGS. 3, 4, and 6, a set of sections are selected from fixed sized sections of the deduplication domain (step 250). Parallel iteration logic 129 iterates each section in the set of section in parallel for deduplication processing where every data block of each section of the set of sections is evaluated for deduplication processing (step 255). For each data block of each section of the set of sections, deduplication server 110 computes the digest with the help of IO Coordinator 104 and file system mapping driver 106 (step 260). Deduplication server 110 returns the digest information to the deduplication daemon (step 265). The deduplication daemon then processes the digest information (step 270). This process repeats until the entire set of data blocks in a section has been iterated through according to the selected iteration scheme. After each section is completely iterated, parallel iteration logic 129 determines if a section may be added to the set of sections for iterating in parallel (step 275). If parallel iteration logic 129 has finished iterating a section from the set of sections and can include a section in the set of sections, work item sorting logic 126 determines a next section that may be added to the set of sections based on the ordered arrangement in which fixed sized sections are arranged (step 280). If parallel iteration logic 129 has not finished iterating a section from the set of sections and cannot include an additional section in the set of sections, the data storage system waits for the section to be iterated completely before adding another section to the set of sections for iterating in parallel (step 285). This process repeats until every section in the deduplication domain has been iterated through according to the iteration scheme.

Figure 8:
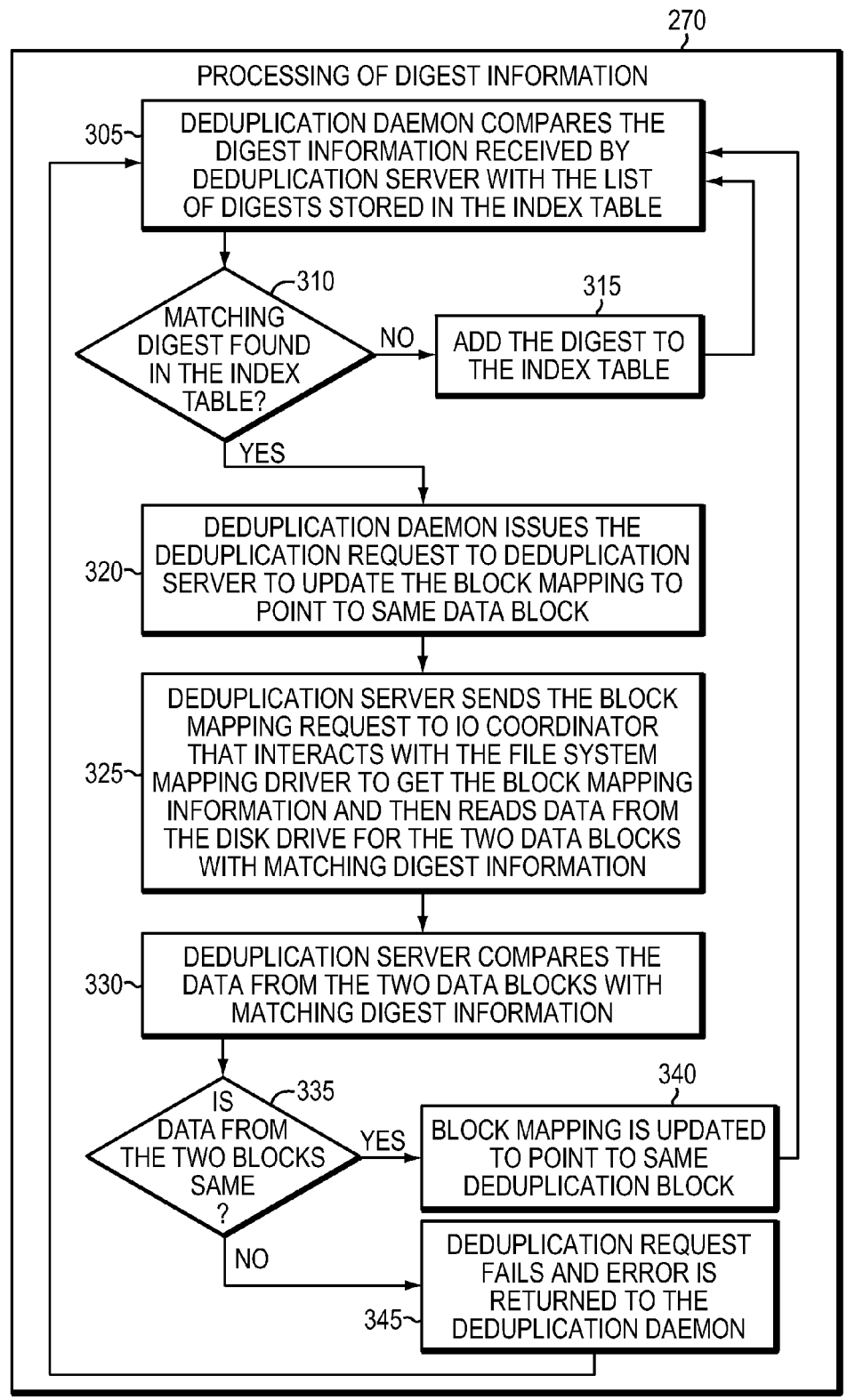

Referring now to FIG. 8 that illustrates a process of deduplicating two data blocks that have been identified as duplicate data blocks during processing of a digest information. With reference also to FIGS. 3 and 4, the deduplication daemon compares the digest information of a first data block received from the deduplication server 110 with the list of digests stored in the index table 125 (step 305). A matching digest found in the index table indicates that the first data block contains exact same data as data stored in a second data block corresponding to the matching digest (step 310). The deduplication daemon issues a request to the deduplication server 110 to deduplicate the first data block and the second data block (step 320). Deduplication server 110 extracts filesystem information from the digest information of the first data block. Deduplication server 110 issues an IO request to the IO Coordinator 104 through Mapped LUN driver 105 (step 325). The IO Coordinator 104 issues a mapping request to the file system mapping driver 106 to find physical address of the first data block. If the mapping request completes successfully, the IO Coordinator 104 reads the data from the first data block located at the physical address indicated by the mapping. The deduplication server 110 issues a read request for the second data block. The read request for the second data block is processed identically to the first read request. When the second read request completes, deduplication server 110 compares the data read from the first data block with the data read from the second data block (step 330). If the data of the first data block is not same as the data of the second data block, the request to deduplicate the data blocks fails and an error is returned back to the deduplication daemon (step 345). If the data of the first data block is same as the data of the second data block, the IO Coordinator 104 requests file system mapping driver 106 to deduplicate the two identical data blocks. If the data blocks are successfully deduplicated, the address mapping of the first data block is updated to point to a single copy of the data (i.e. the address map of the first data block now points to the address map of the second data block) (step 340). If the data blocks are not successfully deduplicated, an error is returned back to the deduplication daemon 105 to update its index table accordingly (step 345). If no matching digest is found in the index table 125 (step 310), digest information for the first data block is added to the index table 125 (step 315).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in iterating in parallel for deduplication, the method comprising:
    selecting a collection of sections from a set of storage extents based on an iteration scheme, wherein a deduplication domain includes the set of storage extents, wherein each storage extent of the set of storage extents is apportioned into a set of sections, wherein each section of the collection of sections includes subset of the contents of a storage extent of the set of storage extents, wherein the contents of a storage extent includes a set of data blocks;
    arranging each section of the collection of sections in an ordered arrangement based on the iteration scheme selected from a list of iteration schemes for applying a deduplicating technique, wherein the list of iteration schemes include a parallel iteration scheme, wherein each iteration scheme of the list of iteration schemes indicates a manner in which the set of storage extents is iterated for applying the deduplicating technique, wherein the ordered arrangement indicates an order in which each section of the collection of sections is processed for applying the deduplicating technique; and
    based on the ordered arrangement, applying the deduplicating technique in parallel to each section of the collection of sections, wherein data blocks in each section of the collection of sections are deduplicated in parallel based on the ordered arrangement, wherein a number of sections of the collection of sections selected for applying the deduplicating technique in parallel are based on a set of processes used for deduplication, wherein each section of the number of sections is iterated by a process of the set of processes.

2. The method of claim 1, wherein each section of the collection of sections includes a set of data blocks, wherein each data block of the set of data blocks is a fixed size chunk of a physical disk storage.

3. The method of claim 1, wherein each storage extent of the set of storage extents comprises a set of LUNs, each LUN of the set of LUNs is a logical representation of a subset of a physical disk storage, each LUN of the set of LUNs includes a set of data blocks, wherein each data block of the set of data blocks is a fixed size chunk of the physical disk storage.

4. The method of claim 1, wherein a logical address space of each storage extent of the set of storage extents is apportioned into a set of sections, wherein each section of the set of sections is equal in size.

5. The method of claim 4, further comprising:
    arranging each section of the set of sections in the ordered arrangement based on the iteration scheme.

6. The method of claim 5, further comprising:
    a) based on the ordered arrangement, selecting the collection of sections from the set of sections;
    b) iterating each section of the collection of sections in parallel for deduplication;
    c) adding a section from the set of sections to the collection of sections based on the ordered arrangement; and
    repeating steps a-c until each section from the set of sections is added to the collection of sections for iterating in parallel for deduplication.

7. The method of claim 1, further comprising:
    storing an iterator on a persistent storage, wherein the iterator indicates a last section to which the deduplicating technique has been applied; and
    applying a deduplicating technique to a section based on the iterator.

8. The method of claim 2, wherein a digest is associated with a data block, wherein the digest is based on contents of the data block and uniquely identifies the data block.

9. The method of claim 2, wherein an index table comprises a set of index entries, wherein each index entry of the set of index entries is associated with a digest of a data block.

10. The method of claim 2, further comprising:
    computing a digest for each data block of each section of the collection of sections; and
    processing the digest for each data block of each section of the collection of sections for applying the deduplicating technique to the collection of sections.

11. The method of claim 10, wherein the processing of digest of a data block further comprising:
    comparing the digest of the data block with one or more index entries of the index table;

determining, based on whether the digest matches with an index entry of the index table, whether to apply the deduplicating technique to the data block;

based on the determination, comparing contents of the data block associated with the digest with contents of a data block associated with the matching index entry; and based on the comparison, applying the deduplicating technique to the data block associated with the digest and the data block associated with the matching index entry.

12. The method of claim 11, further comprising:

based on whether the digest matches with an index entry of the index table, adding an index entry to the index table, wherein the index entry is associated with the digest.

13. The method of claim 2, wherein applying the deduplicating technique further comprising:

updating an address mapping of a first data block to point to a second data block, wherein the first data block and the second data block contain same content of data, wherein the address mapping indicates a location of a data block on a disk storage; and deleting the content of the first data block from the disk storage.

14. A system for use in iterating in parallel for deduplication, the system comprising a processor configured to:

select a collection of sections from a set of storage extents based on an iteration scheme, wherein a deduplication domain includes the set of storage extents, wherein each storage extent of the set of storage extents is apportioned into a set of sections, wherein each section of the collection of sections includes subset of the contents of a storage extent of the set of storage extents, wherein the contents of a storage extent includes a set of data blocks;

arrange each section of the collection of sections in an ordered arrangement based on the iteration scheme selected from a list of iteration schemes for applying a deduplicating technique, wherein the list of iteration schemes include a parallel iteration scheme, wherein each iteration scheme of the list of iteration schemes indicates a manner in which the set of storage extents is iterated for applying the deduplicating technique, wherein the ordered arrangement indicates an order in which each section of the collection of sections is processed for applying the deduplicating technique; and apply, based on the ordered arrangement, the deduplicating technique in parallel to each section of the collection of sections, wherein data blocks in each section of the collection of sections are deduplicated in parallel based on the ordered arrangement, wherein a number of sections of the collection of sections selected for applying the deduplicating technique in parallel are based on a set of processes used for deduplication, wherein each section of the number of sections is iterated by a process of the set of processes.

15. The system of claim 14, wherein each section of the collection of sections includes a set of data blocks, wherein each data block of the set of data blocks is a fixed size chunk of a physical disk storage.

16. The system of claim 14, wherein each storage extent of the set of storage extents comprises a set of LUNs, each LUN of the set of LUNs is a logical representation of a subset of a physical disk storage, each LUN of the set of LUNs includes a set of data blocks, wherein each data block of the set of data blocks is a fixed size chunk of the physical disk storage.

17. The system of claim 14, wherein a logical address space of each storage extent of the set of storage extents is apportioned into a set of sections, wherein each section of the set of sections is equal in size.

18. The system of claim 17, further comprising:

arrange each section of the set of sections in the ordered arrangement based on the iteration scheme.

19. The system of claim 18, further comprising:

a) select, based on the ordered arrangement, the collection of sections from the set of sections;

b) iterate each section of the collection of sections in parallel for deduplication;

c) add a section from the set of sections to the collection of sections based on the ordered arrangement; and repeating steps a-c until each section from the set of sections is added to the collection of sections for iterating in parallel for deduplication.

20. The system of claim 14, further comprising:

store an iterator on a persistent storage, wherein the iterator indicates a last section to which the deduplicating technique has been applied; and apply a deduplicating technique to a section based on the iterator.

* * * * *